United States Patent
Thomsen et al.

(10) Patent No.: US 10,502,191 B2
(45) Date of Patent: Dec. 10, 2019

(54) TRANSPORT FRAME FOR A WIND TURBINE BLADE

(71) Applicant: Vestas Wind Systems A/S, Aarhus N. (DK)

(72) Inventors: Peter Frans Thomsen, Ringkøbing (DK); Adrian Botwright, Sabro (DK); Michael Kastrup, Hornslet (DK); Troels Vahle, Grenaa (DK); Jacob Antonsen, Aarhus N. (DK); Kristoffer Lolk Fredriksen, Aarhus N. (DK); Lucia Quintana, Vejle (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/066,716

(22) PCT Filed: Dec. 23, 2016

(86) PCT No.: PCT/DK2016/050466
§ 371 (c)(1),
(2) Date: Jun. 28, 2018

(87) PCT Pub. No.: WO2017/114532
PCT Pub. Date: Jul. 6, 2017

(65) Prior Publication Data
US 2019/0032639 A1    Jan. 31, 2019

(30) Foreign Application Priority Data
Dec. 30, 2015    (GB) .................................... 1523123.6

(51) Int. Cl.
*B60P 7/12* (2006.01)
*F03D 13/40* (2016.01)

(52) U.S. Cl.
CPC .......... *F03D 13/40* (2016.05); *F05B 2250/41* (2013.01); *F05B 2260/02* (2013.01); *Y02E 10/72* (2013.01)

(58) Field of Classification Search
CPC ........ F03D 13/40; F05B 2260/02; B60P 7/12; B60P 3/40; B65D 85/68
(Continued)

(56) References Cited

U.S. PATENT DOCUMENTS 8,708,625 B1 *    4/2014    Landrum ................. B61D 3/16
                                                                410/44
2013/0104376 A1 *    5/2013    Pedersen ................. B23P 11/00
                                                                29/525.02
(Continued)

FOREIGN PATENT DOCUMENTS

EP    2418376 A1    2/2012
EP    2628945 A2    8/2013
(Continued)

OTHER PUBLICATIONS

Intellectual Property Office, Search Report in GB1523123.6, dated Jul. 11, 2016.
(Continued)

*Primary Examiner* — Hilary L Gutman
(74) *Attorney, Agent, or Firm* — Wood Herron & Evans LLP (57) ABSTRACT

Transport frame and method; the transport frame having a longitudinal, lateral and upright extent, and configured for transporting a root end of a longitudinally extending wind turbine blade having a root face with protruding stud-bolts, said frame comprising a root saddle, said frame further comprising a releasable interface clamp configured for fixing a said blade root in said frame, said interface clamp extending from a forward nose through a rear hinge point in
(Continued)

said root frame and, said interface clamp comprising a body with a forward abutment surface and a bearing surface rearward of said abutment surface, said body being hingedly movable into or out of engagement with one or more stud bolts protruding from the root face of a blade when positioned in said saddle, said interface clamp having a retracted position with its body away from said blade root face and away from said protruding stud-bolts, said interface clamp having an engagement position in which its said bearing surface extends transverse and adjacent to one or more said stud-bolts such that a tightening force applied to a said bearing surface pushes said abutment surface against said root face.

18 Claims, 8 Drawing Sheets

(58) Field of Classification Search
USPC .................. 410/32, 34, 44, 45, 53; 280/404
See application file for complete search history.

(56) References Cited

U.S. PATENT DOCUMENTS

| | | | |
|---|---|---|---|
| 2013/0216325 A1* | 8/2013 | Johnson | F03D 13/40 410/44 |
| 2014/0286723 A1 | 9/2014 | Landrum et al. | |
| 2015/0369209 A1 | 12/2015 | Datta et al. | |
| 2016/0221488 A1* | 8/2016 | Thomsen | B60P 3/40 |

FOREIGN PATENT DOCUMENTS

| | | |
|---|---|---|
| EP | 2708731 A2 | 3/2014 |
| EP | 2796709 A1 | 10/2014 |
| WO | 2010125424 A1 | 11/2010 |
| WO | 2015035997 A1 | 3/2015 |
| WO | 2015149809 A1 | 10/2015 |
| WO | 2016008530 A1 | 1/2016 |

OTHER PUBLICATIONS

European Patent Office, International Search Report and Written Opinion in PCT/DK2016/050466, dated Mar. 31, 2017.

* cited by examiner

TRANSPORT FRAME FOR A WIND TURBINE BLADE

TECHNICAL FIELD

The present invention relates to the field of storage, transportation and handling of large elongate objects, in particular of wind turbine blades.

BACKGROUND

In this context, a special set of logistical requirements interacts with a wide variety of technical and cost constraints, to pose technical challenges for effective or optimal solutions. The ever-increasing size and weight of individual blades adds to these challenges. In general, it may be said that after their construction, wind turbine blades undergo a series of handling and storage stages from their production site to their installation location. These stages may include initial storage at a production site, transportation from a production site to an installation site or to an interim storage or marshalling site. There may be further transportation between one or more interim storage or marshalling sites to an installation site. Each interim storage stage may include transferring steps in which blades are lifted off a first transportation platform and on to another. Storage and handling solutions are sometimes optimised for individual stages of the transition between production and installation. To that end, there may be provided a whole range of support or storage solutions, each individually configured for a particular storage or transport stage and requiring repeated switching between different storage or transport structures. This is costly, time-consuming and can increase the tendency to inflict damage or wear on blades. There can be many advantages arising from devising a blade handling solution which facilitates multiple stages of the transportation process as a whole, including interim storage stages.

The present invention seeks to provide an effective wind turbine blade transport and handling solution which addresses the needs to ensure damage-free transportation of the blades, quick handling during transfers whether between transport platforms or between storage and transportation stages, as well as safety and ease of use by personnel. In aspects, special consideration has been given towards secure transportation of on- or offshore blades by shipping.

Wind turbine blade support and transportation devices are known in which a frame element is applied at a blade root while another co-operating frame element is provided outboard of a blade root region, often in a mid- or tip region. These may be referred to as root- and tip frames respectively. In some cases, these may be stackable thereby allowing several blades to be supported lying more or less horizontal or slightly inclined, and stacked atop one another. For example, WO2015149809 discloses a stackable frame arrangement in which the tip- and root frame each allows a lateral tilting of a respective root or tip support element, thereby accommodating a possible height difference between the level of the tip frame and the level of the root frame. That document also discloses a root frame which has a pivot action. The root is secured to the frame by an attachment means having tubular structures for receiving stud bolts in the blade root face. EP2708731 recites stackable blade frames in which a root support member is supported by a root frame. The root support member is rotatable about a blade lengthwise axis. Moreover, the root support member is connectable to a blade root via tubular sleeves which co-operate with stud bolts projecting from the root face. In EP2796709, an alternative arrangement is shown allowing a root frame, fixed to a blade root, to be rotated when a tip clamp at the blade tip is separated from a tip frame. The tip and root storage fittings can be accommodated in respective transport frames at an angle offset by approximately ninety degrees to the storage orientation. Moreover, that document also discloses a blade root transport frame with attachment plates. Bolts can be passed through these plates into threaded holes in a blade root in which no stud-bolts are present, thereby securing the frame to a blade root. EP2418376 discloses a wind turbine blade transport frame for a blade root, the frame having fixed bars with through holes for fixing to a blade root.

The present invention sets out to provide improvements to known blade frames.

SUMMARY

To these ends, the present invention provides a transport frame. Further optional features thereof are described in the present specification and drawings.

According to the invention, there is provided a transport frame having a longitudinal, lateral and upright extent, and configured for transporting a root end of a longitudinally extending wind turbine blade having a root face with protruding stud-bolts, said frame preferably being securely stackable with similar or identical frames and comprising a root saddle. The frame further comprises a releasable interface clamp configured for fixing a said blade root in said frame. The interface clamp extends from a forward nose through a rear hinge point in said root frame, preferably at a portion of the saddle support. The interface clamp comprises a body with a forward abutment surface and a bearing surface rearward of said abutment surface. The interface clamp body is provided hingedly movable into or out of engagement with one or more stud bolts protruding from the root face of a blade when positioned in the saddle. Preferably, the aforementioned forward abutment surface may be forward facing, which is to say, facing towards the blade root face, i.e. facing in a distal direction relative to the root frame. The abutment surface may extend in a lateral orientation of a blade frame, in particular, in an engaged position of the interface clamp. Preferably the aforementioned bearing surface may be rearward facing, which is to say facing away from the blade root face, i.e. facing along a proximal direction in relation to the root frame. The bearing surface may extend in a lateral orientation of a blade frame, in particular, in an engaged position of the interface clamp. The arrangement of the invention offers a practical and secure solution for restraining a blade root in a root frame.

The interface clamp furthermore has a retracted position with its body away from the blade root face and away from the protruding stud-bolts. In particular, in its retracted position, the interface clamp is positioned vertically clear of the stud-bolts. A blade root may thereby be positioned in a frame without interference with the root fixing means. The interface clamp has an engagement position in which its bearing surface extends transverse and adjacent to one or more stud-bolts such that a tightening force applied to a bearing surface e.g. by a tightening nut on a stud bolt, pushes the abutment surface against the root face. Thereby, the root frame assumes a rigid fixed position in relation to a blade root. This improves stability, in particular in relation to longitudinal forces exerted by the blade on its support frame.

Optionally, the interface clamp may be configured such that the abutment surface is provided on an abutment plate at a the nose of the interface clamp body, while a bearing surface is provided on a bearing plate at a rearward portion of the body, spaced apart from the abutment plate. The abutment plate may be configured for engagement with a first stud-bolt, wherein the bearing plate may be configured for engagement with a second stud-bolt and/or third stud-bolt, each or either being preferably directly adjacent the first stud-bolt. The interface clamp may comprise a grab handle to facilitate movement of the interface clamp, by an operator, between its engagement position and its retracted position. Preferably therefore, the interface clamp has a weight sufficiently low to permit lifting and handling by an operator, preferably without using power tools, preferably manually or preferably with hand tools. The hinge point of the interface clamp is anchored in the root frame, thereby ensuring stability during handling by an operator. This also ensures stability of the blade root during transportation. The root saddle may be pivotable on a saddle support of the root frame and the hinge point of the interface clamp may preferably be fixed to the saddle support and movable relative to the frame along with the pivot motion of the saddle. In other words, the interface clamp is preferably fixed to and articulated on the root saddle assembly which itself has some freedom of movement, in particular a tilting action about a lateral axis of the root frame. The interface clamp, when engaged with a blade in the root saddle may thereby follow any pivoting movement, relative to the root frame, of the blade in its saddle. Moreover, in aspects of the invention, the interface clamp may be length-adjustable between its forward nose and its rearward hinge point. In particular, the interface clamp may be length-adjustable between its body and its hinge point. In this way, there is provided some tolerance in the lengthwise location of the blade root in the root frame. If the root is positioned a little far forward—i.e. too shallow in the frame—within limits, then the length of the interface clamp can be increased a little, always ensuring that when engaged, the interface clamp abutment surface will contact the root face of the blade. Conversely, if the root is positioned a little far back in the root frame, i.e. too deep inside the frame, within limits, then the length of the interface clamp can be decreased a little, always ensuring that when engaged, the interface clamp abutment surface will contact and abut the root face of the blade.

Optionally, the interface clamp may be lockable in a retracted position against movement about its hinge point. To this end, there may be provided a lock mechanism associated with the interface clamp, preferably at its hinge to the root saddle assembly. The interface clamp may in particular include an interface clamp blocker, capable of blocking movement of the interface clamp under gravity and in a direction away from the root saddle or blade root. This will preferably avoid the possibility that the interface clamp may fall down and lie flat, possibly protruding from a root frame as a result. It may also ensure that the interface clamp, in a retracted position thereof, will be in a ready position for grasping by an operator and placing in an engagement position. This may also ensure that the interface clamp need not be lifted, or not significantly lifted when in its retracted position and prior to placing in an engagement position. A lowering of the interface clamp from its retracted position may be all that is required to place it in its engagement position, thereby making an operator's task easier, quicker and safer.

The frame according to the invention may comprise preferably two or three, or more interface clamps. This has the advantage of increasing the stability of the blade root fixing and of allowing each interface clamp to be of smaller dimensions and weight than it would need to be if there were only a single one.

In embodiments, the abutment surface and/or a bearing surface may be provided on a respective abutment plate and/or bearing plate of the interface clamp body. The abutment and/or bearing plate may be configured to extend transversely on both sides of a stud-bolt protruding from a blade root face. In further optional aspects, the abutment plate and/or bearing plate of the interface clamp body may be provided slotted for receiving a stud-bolt in the slot. Preferably the slot may be provided with a lip, cuff, or lining of a resilient non-scratching material. In aspects, the bearing plate may provide a bearing surface for more than one tightening element acting in association with respective more than one stud-bolts. In aspects, an abutment surface may co-operate with one or more stud-bolts. In still further aspects, an abutment plate may comprise a slot for receiving a first stud-bolt, while a bearing surface may comprise more than one slot, for receiving neighbouring stud-bolts on either side of the first stud-bolts. In this way, tightening elements pushing the interface clamp against a root face may be easily reached and adjusted by an operator since they are a little separated from each other.

Preferably, substantially all longitudinal forces between the frame and a blade supported therein are transmitted via one or more interface clamp, when the interface clamp or clamps is/are in an engagement position with the blade root face and stud bolts.

In a further aspect according to the invention, there is provided a transport frame pair configured for transporting a wind turbine blade, the frame pair comprising a tip frame and a root frame, each tip and root frame being stackable with identical frames for blade transport or storage, and wherein each one of the tip and root frame comprises four upright frame struts which together define a generally cuboid internal space having a longitudinal extent between two pairs of upright struts. The tip frame comprises a tip saddle assembly within the generally cuboid internal space, and the root frame comprises a root saddle assembly within the generally cuboid internal space. Furthermore, the root frame is configured to prohibit a translation movement of the root saddle assembly in a longitudinal direction of a blade supported in a root saddle of the root saddle assembly. According to this aspect, the root frame is a transport frame according to the present invention, as set forth above. Still further according to this aspect, the tip frame allows a translation movement of the tip saddle assembly in a longitudinal direction of a blade supported in a tip saddle of said tip saddle assembly. Accordingly, the tendency for a transported blade to transfer longitudinal loads, arising e.g. from rocking or vibration movements, to a tip frame or tip frame stack may be reduced. This can lead to a reduced need for lashing a tip frame or tip frame stack during transport. Conversely, the longitudinal loads arising during transport are transmitted to the root frame via the interface clamp or clamps in their engagement position. These, being configured according to aspects of the invention, nevertheless offer a secure connection between the root frame and the blade. Furthermore, loads transmitted to the root frame may be dissipated. This effect may be increased by increasing the dimensions of the root frame, in particular a lengthwise dimension. Optionally, therefore, the longitudinal extent of the root frame may be more than twenty percent greater than the longitudinal extent of the tip frame.

In a still further aspect, there is provided a method for securing a wind turbine blade root in a root transport frame as set forth hereinabove, wherein the wind turbine blade has a root face with stud-bolts protruding therefrom, and wherein the method includes placing the wind turbine blade root in the root saddle of the transport frame, securing the blade root by positioning the hinged interface clamp on one or more stud-bolt of the wind turbine blade such that a bearing surface of the interface clamp body lies immediately adjacent and transverse to the stud-bolt. The method further includes applying a pushing force on the bearing surface by means of a tightening member on the stud-bolt thereby urging an abutment surface of the interface clamp body into engagement with the root face, thereby immobilising the blade against longitudinal movement in relation to the hinge point and/or in relation to said frame.

In a further aspect, the method may further include the step of adjusting the length of the interface clamp between its hinge point and its nose, preferably prior to applying a tightening force on the bearing surface. A certain flexibility in terms of the exact longitudinal positioning of the blade root face within the frame is thereby possible. In a further preferred aspect, the method may further include securing a wind turbine blade in a transport frame pair as set forth above, and transporting the wind turbine blade with the tip saddle assembly freely movable in translation in a longitudinal direction and relative to the tip frame. This arrangement will prevent the transfer of longitudinal loads to the tip frame or tip frame stack, thereby reducing the need for lashing during transport and also reducing stress ion the blade itself, which would otherwise be greater if the blade were captive and immovable in a longitudinal direction, in both the tip and in the root frame.

BRIEF DESCRIPTION OF THE DRAWINGS

Additional aspects of the invention including various optional features thereof will be explained with reference to the following non-limiting examples including the following drawings in which.

DETAILED DESCRIPTION

Figure 1:
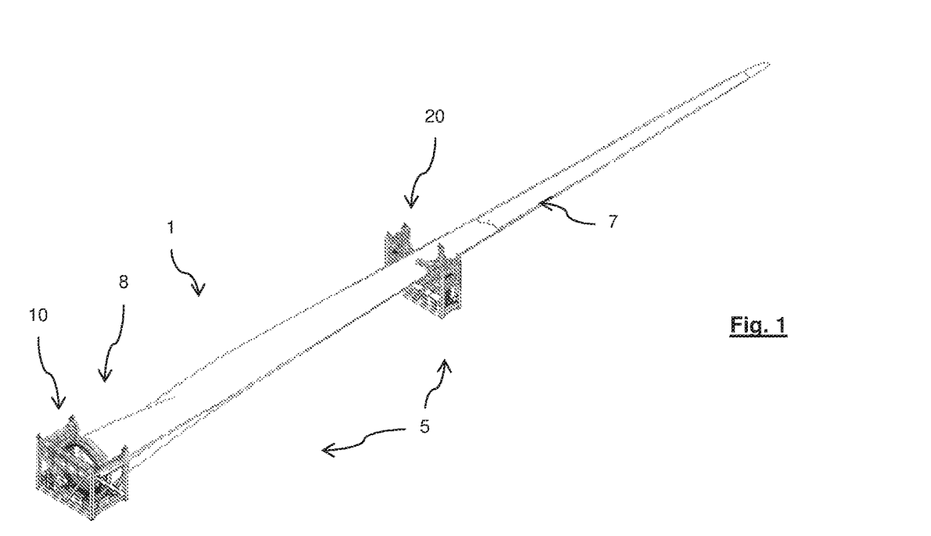
FIG. 1 shows a transport frame pair supporting a wind turbine blade.
Figure 2:
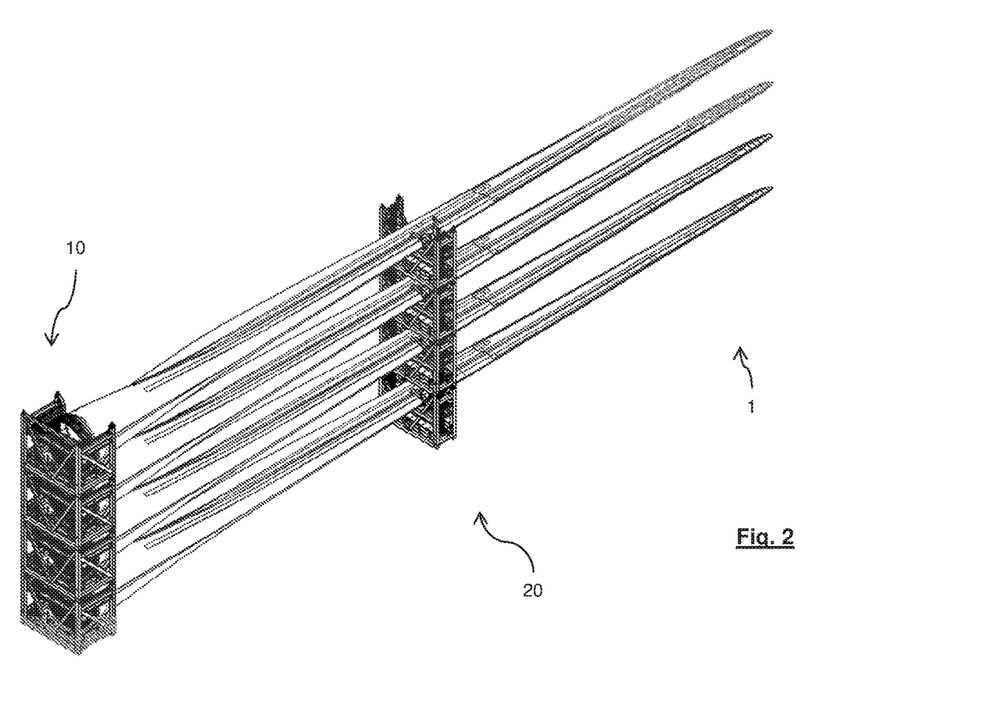
FIG. 2 shows several wind turbine blades supported in a stack of frame pairs.

FIG. 1 illustrates a frame pair consisting of a transport frame 5 in the form of a root frame 10 and a transport frame 5 in the form of a tip frame 20 with a wind turbine blade 1 supported therein in a generally horizontal orientation. A chordwise direction of the blade 1 may also lie generally horizontal when supported in the respective transport frames 5. As is generally understood, the blade 1 extends from a root end to a tip end which may also be correspondingly referred to as a proximal and a distal end respectively. The frames of the frame pair are stackable, as illustrated in FIG. 2. Each root and tip frame 10, 20 includes a respective root saddle assembly 80 and tip saddle assembly 50 as will be described more fully below. In the design illustrated here, each tip and root frame includes a single respective tip- or root saddle assembly 50, 80. Associated with the respective saddle assembly are additional elements for keeping the respective blade root 8 or tip region 7 securely in place in the respective frame 10, 20. For the purposes of the present context, the tip region 7 may also denote a mid-region of a blade 1. Expressed differently, a tip frame 20 may be positioned anywhere between a mid- and a tip-region 7 of a blade 1.

FIG. 2 illustrates a stacked arrangement of multiple blades 1, with each blade supported in a frame pair 10, 20. The stacked arrangement is achieved by stacking the respective root frames 10 on top of each other and the tip frames 20 likewise. To that end, each of the tip frames 20 and root frames 10 is constructed accordingly, as can be seen for example from FIGS. 3, 4 and 5. Preferably, the frame construction in each case includes rigidly connected frame struts, including upright struts 71, 72, 91, 92 extending between a respective root or tip frame base 75, 95 and a respective root or tip frame top 76, 96. Preferably, these respective upright struts 71, 72, 91, 92 may define respective upright extending corner edges of each transport frame 5. Preferably therefore, respective upright struts may be provided in pairs of proximal upright struts 71, 91 and distal upright struts 72, 92. Lateral struts 74, 94 extend rigidly between upright struts 71, 91, 72, 92, thereby define a respective proximal frame portion and a distal frame portion. Lengthwise struts 73, 93 longitudinally connect respective proximal and distal frame portions. In the example illustrated, lengthwise struts 73, 93 extend between proximal upright struts 71, 91 and distal upright struts 72, 92 or between respective proximal and distal lateral struts 74. The respective frame struts of the tip or root frame 20, 10 thereby define a three dimensional interior space. In the example illustrated here, the tip- and root frame 20, 10 each defines an approximately cuboid interior space inside which a respective tip saddle assembly 50 or root saddle assembly 80 is accommodated. The base 75, 95 of the tip and root frames 20, 10 may describe a substantially rectangular footprint in a lateral and longitudinal plane of the frame.

Figure 3:
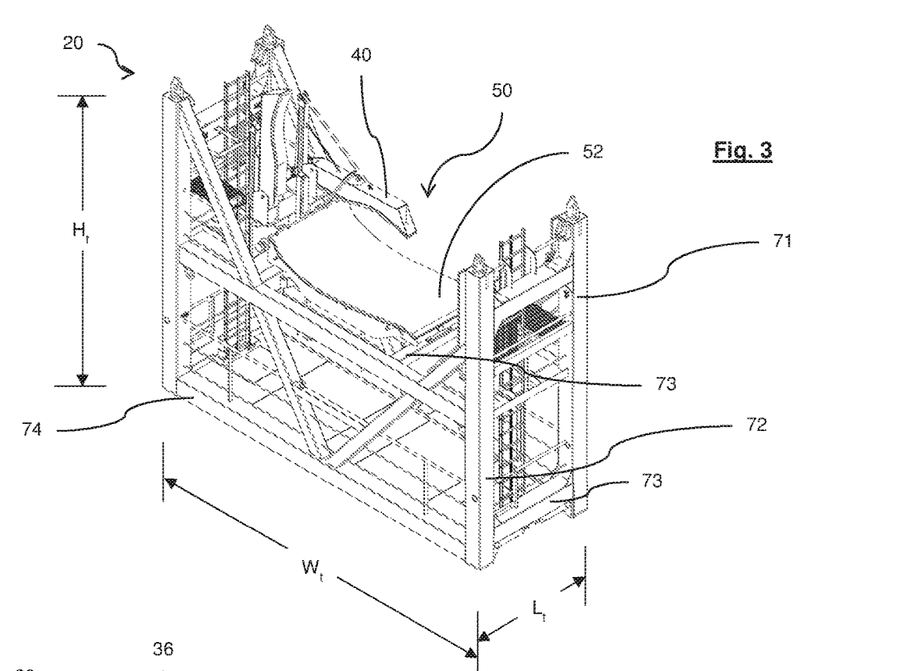
FIG. 3 shows a perspective view of a tip transport frame.
Figure 5:
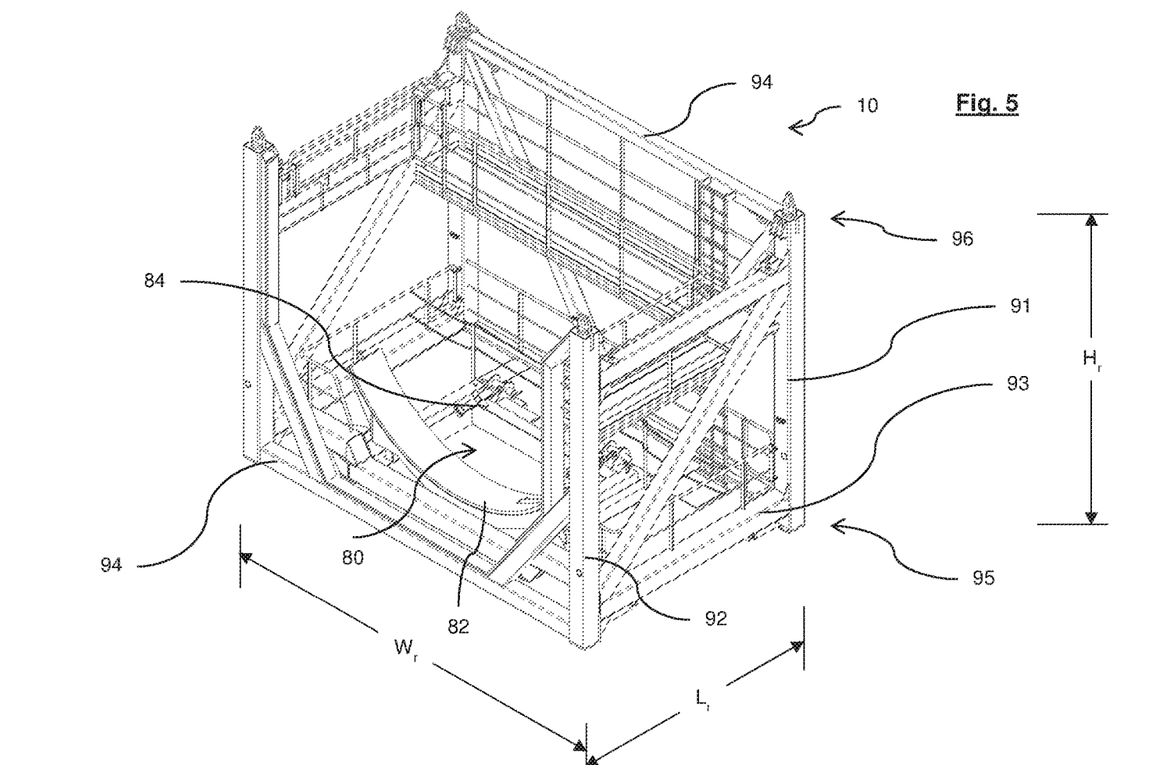
FIG. 5 shows a perspective view of a root transport frame.

As can be seen from the tip frame 20 illustrated in FIG. 3 and the root frame 10 illustrated in FIG. 5, each frame exhibits a height extent H, a lateral extent W and a lengthwise extent L.

At the top 76, 96 of each tip or root frame 20, 10 may be provided locating fingers 36 which may co-operate with a recess (not visible in these drawings) at the bottom 75, 95 of the relevant frame. Necessarily, a recess or finger 36 of a first tip or root frame 20, 10 will co-operate to facilitate stacking with the corresponding finger 36 or recess of a similar frame to be stacked atop or beneath.

Stacking frames for storage or stowage, as well as transferring frames off from stacks or onto stacks can be made easier when the effective height dimension $H_t$ of the tip frame 20 of a frame pair is equal to or substantially equal to the effective height $H_r$ of the root frame 10. In this context, the effective height of a frame may correspond to be the distance from a contact surface beneath the frame base 75, 95 on which the frame may rest in e.g. a storage or stowage or transport situation, to the frame top 76, 96, on which a superposed, stacked frame will rest. Preferably, also the effective width dimension $W_t$ of the tip frame 20 of a frame pair may be equal to or substantially equal to the effective width $W_r$ of the root frame 10. In the present context, the effective width of a frame 5 may correspond to the distance between the outermost surface of a proximal 72, 92 or distal 71, 91 pair of upright struts.

Figure 4:
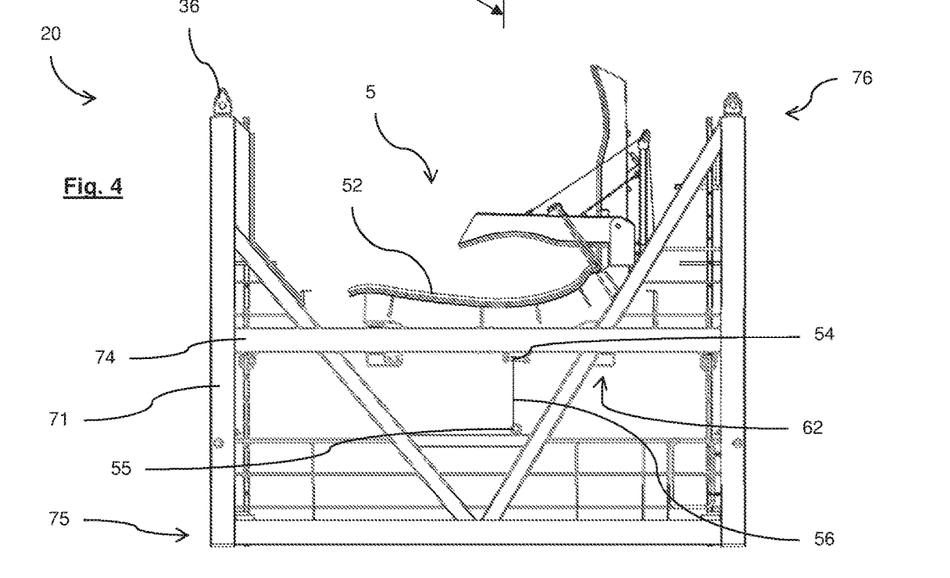
FIG. 4 shows a side view of a tip transport frame.

FIGS. 3 and 4 show a tip saddle assembly 50 within tip frame 20. The tip saddle assembly 50 comprises a saddle 52 and a saddle support 62. The tip saddle 52 may be configured with a support surface shaped to conform to the shape of a blade surface towards its tip, e.g. in a mid- or tip region thereof. In the illustrated embodiments, the tip saddle is configured to extend between a blade trailing edge 3 and a blade leading edge 2. As can better be seen from FIG. 3, the tip saddle assembly 50 may be supported on longitudinally extending frame struts 73. In particular, the tip saddle support 62 may be supported on longitudinally extending frame struts 73. Preferably, the tip saddle 52 may be slidable in translation in a lengthwise direction of the tip frame 20. This in effect corresponds to a movement of the tip saddle 52 in a lengthwise direction of the blade. Preferably, the tip saddle 52 is capable of sliding freely in the aforementioned lengthwise direction.

A free running translation movement of a tip saddle assembly 50 may be provided in particular by a sliding connection between the tip saddle assembly 50 and the tip frame 20. In particular, a tip saddle support 62 may be slidable along a track formed or supported by longitudinally extending frame struts 73. The sliding action may be enhanced by providing low-friction surface strips and/or rollers on the tip saddle support 62 at its contact surfaces with the tip-frame 20.

In embodiments, the tip saddle 52 may be tiltable on the tip saddle support 62. In particular, the tip saddle 52 may pivot about pivot points aligned on a pivot axis preferably parallel to the lateral dimension of the tip frame 20. Preferably, the tilt action allows free tilting movement between the tip saddle support 62 and the tip saddle 52, preferably about through an angle of at least five or ten degrees or arc, still preferably at least twenty degrees of arc, still preferably, between five or ten and thirty degrees of arc, still preferably, between fifteen and thirty degrees of arc.

Also shown in FIGS. 3 and 4 are clamping arms 40 for securing the blade mid- or tip-end on the tip saddle 52 in the tip saddle assembly 50. According to aspects of the invention, one or more such clamping arms 40 may be provided in connection with a tip saddle assembly 50, in particular as part thereof. In the example shown, two clamping arms 40 are provided in association with each tip saddle 52 and tip saddle assembly 50. A clamping arm 40 may be opened to allow insertion or removal of a blade into or from a tip frame. A clamping arm 40 may be closed to keep the blade in place. In FIG. 3, a proximal clamping arm 40 is shown closed, while a distal clamping arm 40 is open. Raising and lowering apparatus may be provided for operating the clamping arms. In particular, the raising and lowering apparatus may be manually operable by an operator to effect opening or closure of a clamping arm 40. The clamping arm 40 may have considerable weight for the purpose of reliably enabling manual lowering into a closed position, in particular enough to overcome the effect of friction resistance to movement in its winch or hinge system. The provision of more than one clamping arm 40 at a tip saddle assembly may allow for larger blades to be effectively clamped in a tip saddle assembly 50 while at the same time keeping each clamping arm 40 down to a size and weight such as to allow manual operation by an operator, preferably using tools such as hand tools and preferably not using power or powered tools.

In aspects of the invention, the tip saddle assembly 50 may be inhibited or blocked against its free translation movement in the tip frame 20. This may be achieved by applying a tip saddle preventer 56 capable of blocking relative movement between the tip saddle assembly 50 and the tip frame 20. One or more such preventers 56 may be applied, in particular two or more may be applied. The preventer 56 may be rigid such as a locking rod or flexible, such as a preferably inextensible strap, belt, line, cable or rope. In FIG. 4, a preventer 56 is shown in the form of a flexible strap. Preferably, a preventer 56 may be attachable to attachment points arranged at the tip saddle assembly 50, preferably at a tip saddle support 62 thereof. A preventer 56 may thus extend at a first end from an attachment point at a tip saddle assembly 50 to another attachment point 55 at a second end of the preventer, the attachment point 55 being at the tip frame 20, optionally at a laterally extending strut 74 thereof. The preventer 56 may be fixed in any suitable way, at respective first and second ends. The preventer 56, may be of inextensible material such as a metallic material or a non-stretch polymeric material such as a polyamide, polyaramid or UHMWP material. The preventer 56 may additionally pass through a fairlead 54 fixed to the tip frame 20. A fairlead 54 may comprise a roller fairlead. In aspects of the invention, a tensioner 57 may be used to apply tension to a flexible preventer 56. When fixed to attachment points 55 respectively at the tip frame 20 and at the tip saddle assembly 50, the preventer 56 may thus be brought under tension, ensuring that a translation movement of the tip saddle assembly 50 is thereby prohibited in at least one direction parallel to a lengthwise axis of the frame pair. Preferably, an additional preventer 56 of a same or different type may be applied to prevent movement in an opposite direction parallel to a lengthwise axis of the frame pair. In addition, in embodiments, a preventer 56 may comprise a disengageable connector at either or both its first and second ends. The preventer 56 may thereby be disengaged from the attachment points 55 at one or both ends thereof. In one aspect, a disengageable connector at a preventer 56 may comprise a hook (not shown) capable of being engaged with or disengaged from an attachment point 55.

As shown in FIG. 5, a root saddle assembly 80 is provided in a root frame 10 of a frame pair. The root saddle assembly 80 may in embodiments be optionally or preferably connected to the root frame 10 in such a way that translation movement of the root saddle assembly 80 relative to the root frame 10 is excluded. A root saddle 82 may be configured with a support surface shaped to conform to the shape of a blade surface at its root. The root saddle 82 may thereby appropriately have an arcuate blade root support surface. In the example shown, the root saddle 82 maybe tiltable in the root frame 20. The root saddle assembly 80 includes clamps or clamp attachments or other fittings for securely holding the blade root in the root saddle 80. These clamps may be in the form of attachments for a blade about the root periphery and/or in the form of root face restrainers such as interface clamps described in more detail below. Such root restrainers may in particular be configured to be attached to stud-bolts protruding from a blade root and thereby prohibit longitudinal movement of a blade 1 in a root frame 10. Additional detail of interface clamps is given below with reference to FIGS. 6-10.

In accordance with aspects of the invention, it is preferred for the root frame 10 of a pair to have an effective length Lr greater than the effective length Lt of the tip frame 20. In this context, the effective length of a frame 10, 20 may correspond to the distance between the most proximal surface of a proximal upright strut 72, 92 and the most distal surface of a distal upright strut 71, 91. Still preferably, the effective length Lr of the root frame 10 of a frame pair may be at least twenty percent greater than the effective length Lt of the tip frame 20. Still preferably, the effective length Lr of the root frame 10 of a frame pair may be at least thirty percent greater than the effective length Lt of the tip frame 20. Still preferably, the effective length Lr of the root frame 10 of a frame pair may be at least forty percent greater than the effective length Lt of the tip frame 20. The stability of a root frame 10 or root frame stack may thereby be further enhanced. Moreover, the overall stability of a frame pair or of stacked frame pairs may thereby be enhanced owing to the increased propensity for load dissipation through the root frame 10 or root frame stack while underway. The larger lengthwise dimension of a root frame may furthermore reduce the need for lashings between a transport surface and a root frame 10 or root frame stack. In this context, it may be appreciated that the internal volume defined by a tip frame 20 may preferably be at least twenty percent less or at least thirty or forty percent less than the internal volume defined by a root frame 10.

Large wind turbine blades can typically weigh between five and thirty tons. Vibrations or rocking motions during transportation by train or truck, and in particular by sea transport—perhaps due to rough seas—can place severe strain on the blade support frames both at a tip and at a root end. The need for lashings to a transport platform can require much time to set up and remove, especially when blade frames are stacked. All of which increases idle time of capital equipment such as ships or trains etc. In order for the transport frames to fulfil their role in stabilising the supported blades, the blades need above all to be securely fixed in them. In particular, it is of importance that a root end of a transported blade be reliably secured. This may apply all the more when using a tip saddle assembly 50 which may be freely movable in translation in a longitudinal direction relative to the tip frame 20. In such situations, the longitudinal loads acting on the root frame 10 may be considerable. Preferably, these loads are safely dissipated without rupture of any fittings. A secure fixing of a blade root 8 in a blade frame 10 may nevertheless advantageously be carried out swiftly by operators, preferably with few tools, preferably manually, possibly with hand tools and preferably without the need for power or power tools. The interface clamp 84 which forms part of the present invention can provide many or all these advantages.

Figure 6:
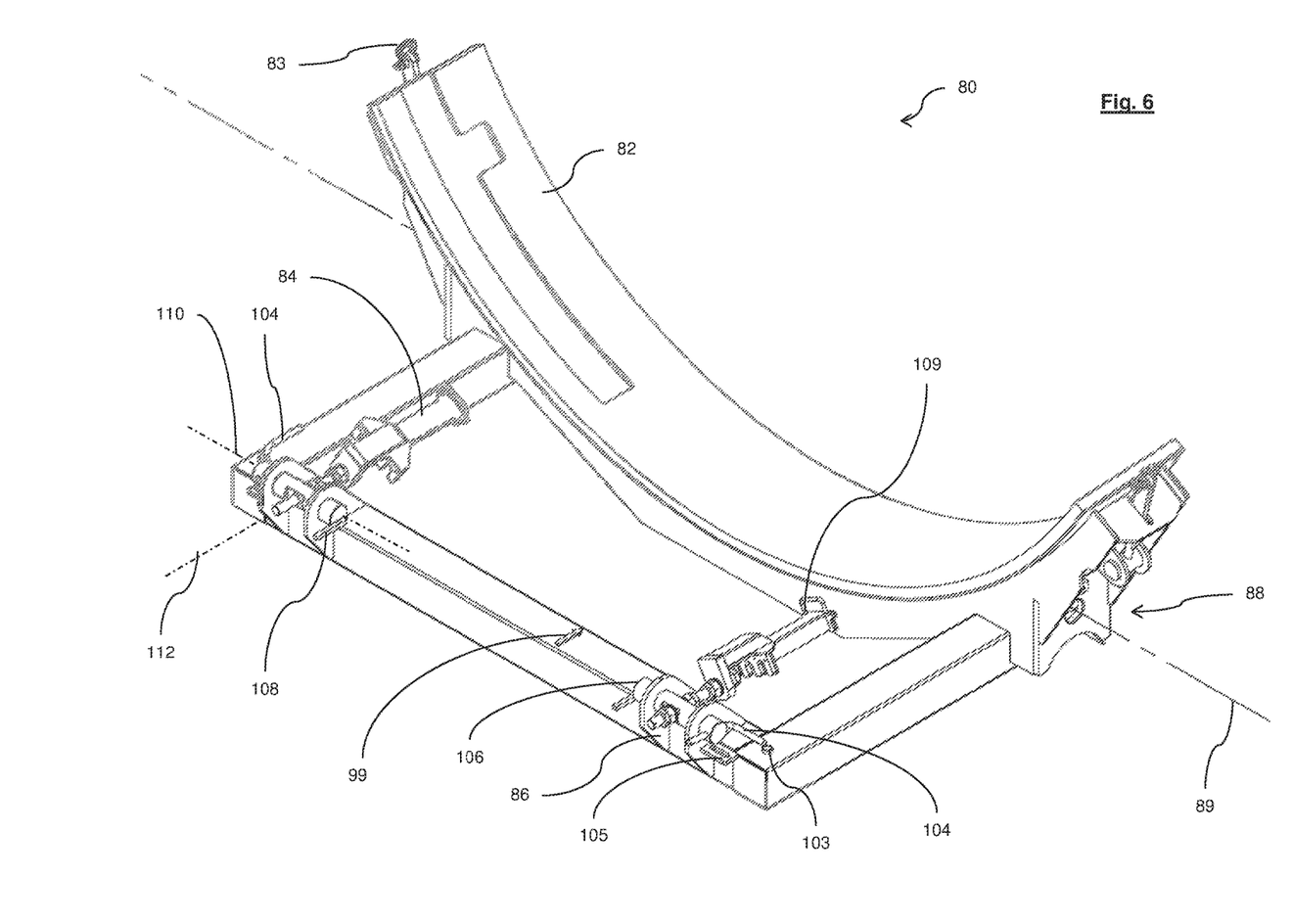
FIG. 6 shows a detail of a root saddle assembly.
Figure 7:
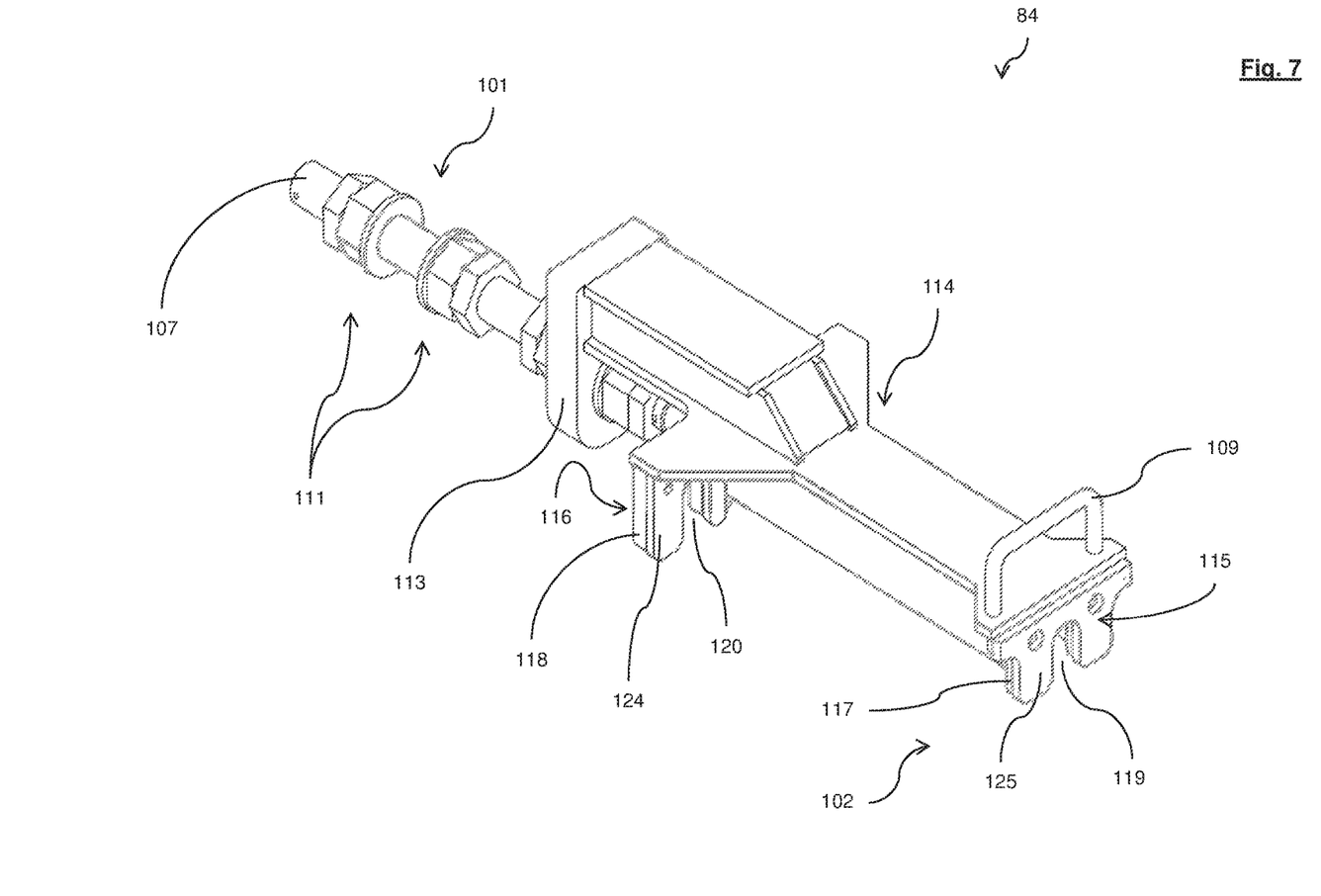
FIG. 7 shows a perspective view of a root frame interface clamp.
Figure 8:
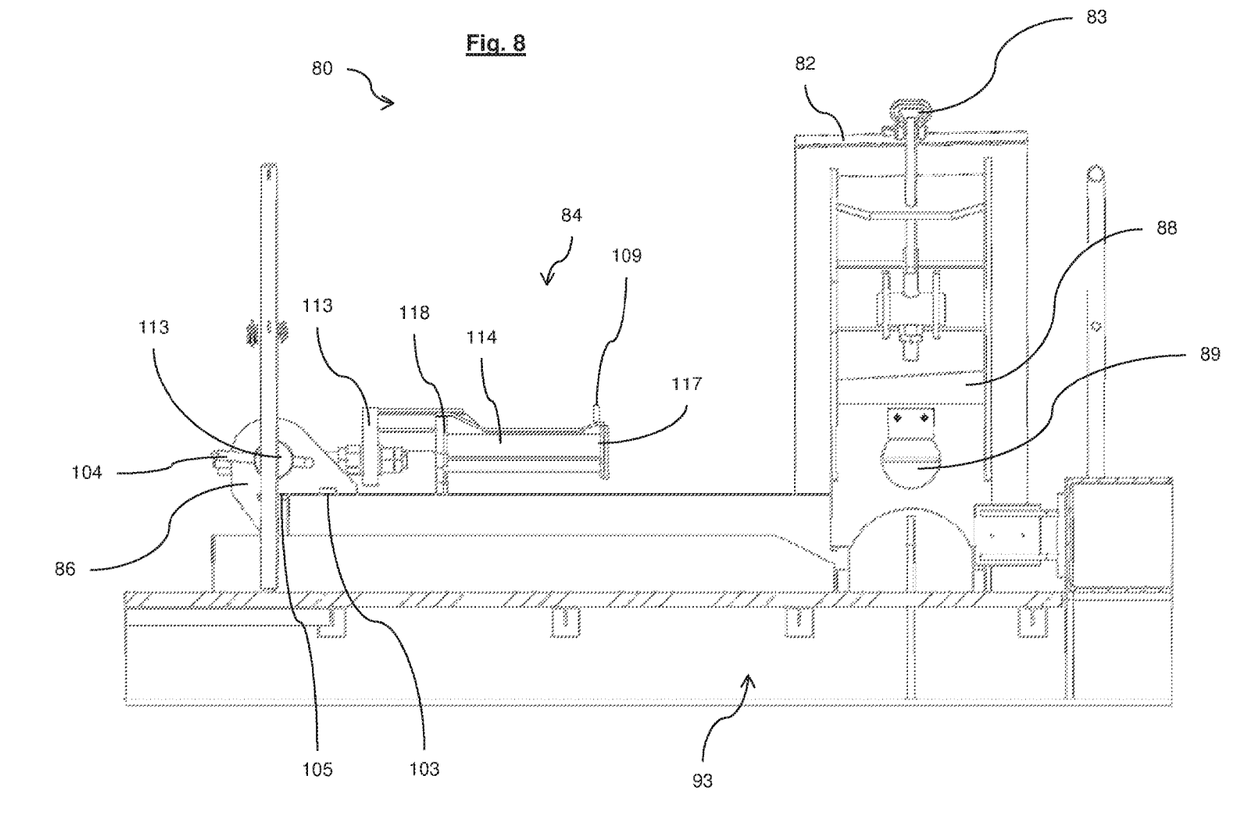
FIG. 8 shows a side view of a root saddle assembly.

In FIG. 6, there is shown a pair of interface clamps 84, both associated with a single root frame 10 (see FIG. 5) and in particular with a root saddle assembly 80 associated with a said root frame 10. The interface clamp 84, its arrangement in relation to a root frame 10 and its functioning will be explained with reference to FIGS. 6-10 and FIG. 10a. Although the invention may comprise a single interface clamp 84 at a root frame 10, it is preferred, especially where larger blades 1 are to be transported, to provide two or more such interface clamps 84. Each clamp 84 may preferably be fixed to a root frame 10, preferably at a root saddle assembly 80 thereof. A clamp 84 may be hingedly fixed to said root frame 10 at a hinge 106 fixed in a hinge body of the root frame 10, in particular in a hinge body 86 of the root saddle assembly 80. The hinge 106 may turn about a laterally extending axis 110. The interface clamp 84 may thereby extend approximately between a rearward hinge point 101 and a forward nose 102 (see FIG. 7). When in an engaged position, the illustrated interface clamp 84 in particular extends in a distal direction from a hinge 106, with its nose facing towards a blade root face 9 (see FIG. 9 or 10). This corresponds to a parallel alignment between the longitudinal extent of the interface clamp 84 and a longitudinal direction L of the frame 10. In a retracted position of said clamp 84, the clamp may extend substantially in an upward direction, more or less vertical with its various elements vertically away from any stud bolts 11 of a blade 1. In particular, the frame 10 may be configured such that the clamp 84 may be vertically clear of any said stud-bolts 11, i.e. the interface clamp 84 may be held such that all its elements are in a proximal direction of the extremity of any stud bolts 11 of a blade root 8. This may be assisted by providing a lock 104 capable of restraining the interface clamp 84 in a retracted position. In the illustrated embodiment, the lock 104 may be in the form of a pin releasably passing through a hole in said hinge 106 and engaging with a fixed locking plate 105 which, in the illustrated embodiment, is fixed to the root saddle assembly 80. In order to prevent the interface clamp 84 from falling flat, in particular such that it might protrude beyond the limits of the root saddle assembly 80, possibly posing a hazard, a blocker 108 may also be provided at the hinge 106. In the illustrated embodiment, the blocker 108 is shown as a rigid pin fixed to the hinge barrel 106 and rotatable with the hinge barrel 106, in other words, rotatable together with the interface clamp, about its hinge axis 110. When in a retracted position, that is to say with the interface clamp 84 oriented substantially vertically, the blocker 108 may abut against a portion of the root frame 10, thereby preventing further rotation of the interface clamp 40 about its hinge 106 in a direction away from a blade root saddle 82.

The interface clamp 84 may extend generally longitudinally between its forward nose 102 and its rearward hinge point 101. When fixed to a hinge 106, especially at its hinge point, the interface clamp can swivel about a longitudinal axis 112 which, in the case illustrated, is the longitudinal axis of a rearward shank 107 of the interface clamp. A body portion 114 of the interface clamp 84 may extend from a forward nose 102 to a load plate 113 (see FIG. 7, 8 or 10), which load plate 113 may be connected to a length-adjustment mechanism of the interface clamp 84, which also encompasses the said hinge point 101. A rearward portion of said interface clamp 84 may include a shank 107, which may in particular serve as a length-adjusting element. In the illustrated embodiment, the shank 107 may be threaded and may extend through a passage in the hinge 106. Length adjusters 111 may engage both the hinge 106 and the shank 107 to move forward or backward the body 114 of the interface clamp 84. A proximal end of the shank 107 may engage the aforementioned load plate 113. Preferably, the load plate 113 is provided with a hole 122 through which the shank 107 may pass. Height regulators 123 may allow an adjustment of the height of the interface clamp body 114 in relation to the root saddle assembly 80. In particular, the hole 122 may be a slotted hole allowing some freedom of movement of the shank 107 in a height direction H of the root frame. Height regulators 123 may comprise threaded nuts or other fixing means, capable of fixing the height of a shank 107 in the slotted hole 122 through the load plate 113. With the load plate 113 fixedly engaged with and forming part of the body 114 of the interface clamp 84, any adjustment of the height of said shank 107 on said load plate 113 necessarily sets the height of the body 114 in relation to the hinge 106 and thereby also in relation to the root frame 110 and the root saddle assembly 80. As such, also the height of the body 114 in relation to a root end 8 of a blade 1, when in the saddle 82, will also thereby be adjusted.

The body 114 of the illustrated interface clamp 84 includes a root face abutment surface 115 at a forward end thereof and facing forward. Facing rearward is a bearing surface 116 configured for being engaged by an adjustable pushing arrangement 121 associated with one or more stud-bolts 111. In the illustrated embodiment, the abutment surface is provided on an abutment plate 117. It would be possible for the rear side of the abutment plate 117 to provide a bearing surface for engaging a pushing arrangement 121. However, in the illustrated embodiment, the bearing surface 116 is shown on a bearing plate 118 which itself is longitudinally separated and spaced from the abutment plate 117. The distance between an abutment plate 117 and a bearing plate 118 may suitably lie in the region of at least half the length of a stud-bolt 111, preferably at least two-thirds the length of a stud-bolt 111. Preferably, an abutment surface 115 may extend laterally on both sides of a slot 119 configured to receive a stud-bolt 111 when in an engaged position of the interface clamp 84. Preferably, a bearing surface 116 may extend laterally beyond at least two slots 120 configured to receive neighbouring stud-bolts 111, including, preferably at least the one stud bolt 111 which also passes through the abutment slot 119. Still preferably, a bearing surface 116 may extend laterally beyond at least three bearing slots 120 configured to receive neighbouring stud-bolts 111, including, preferably at least the one stud bolt 111 which also passes through the abutment slot 119. In this arrangement, which is illustrated, the stud-bolt 111 which passes through the abutment slot 119 may pass through a central portion of the bearing plate 118. In aspects, the central portion of the bearing plate 118 may also comprise a bearing slot 118.

It may be noted that the term 'forward', when applied to the interface clamp 84, corresponds to distal direction, when applied to a blade 1 or to a tip or root frame 20, 10. Conversely, the term 'rearward', when applied to the interface clamp 84, corresponds to proximal direction, when applied to a blade 1 or to a tip or root frame 20, 10.

The interface clamp 84 may include a grab handle 109, preferably at a body 114 thereof, preferably near a forward nose end 12 thereof, to assist manipulation and handling by an operator. In order to avoid damage to the stud-bolts 111 or to the interface clamp 84, the respective abutment or bearing surfaces 116 may be provided with a resilient lining 125, 124 which preferably protrudes slightly into the respective bearing slots 120 or abutment slots 119.

In use, and for example in root frame 10, not occupied by a blade 1, an interface clamp 84 may be placed in its retracted, upright position. An operator may carry this out by grasping the grab handle 109 and raising the clamp 84 upward, against its own weight, in rotation about the hinge 106. When in an upright position, the operator may take a lock 104 from a lock retainer 103 and place the lock 104 through the hinge barrel 106 and also through a locking plate 105, thereby immobilising it in the retracted position and clear of the root saddle assembly 80. A wind turbine blade root 8 may be lowered gently into the root frame 10, preferably using a crane. The blade root 8 may be placed carefully in the root saddle 82 such that its root face 9 lies within a prescribed tolerance zone, at a distance from the hinge 106. The rotational orientation of the blade root 8 in the root saddle 82 is adjusted so that the blade lies in a reference orientation in which a reference stud-bolt 11, which may be specially marked, or missing, is aligned with a reference marker 99 on the root frame 10. This ensures that the blade's chordwise orientation corresponds to the orientation of the tip saddle 52 in a tip frame 20 of a frame pair.

Figure 9:
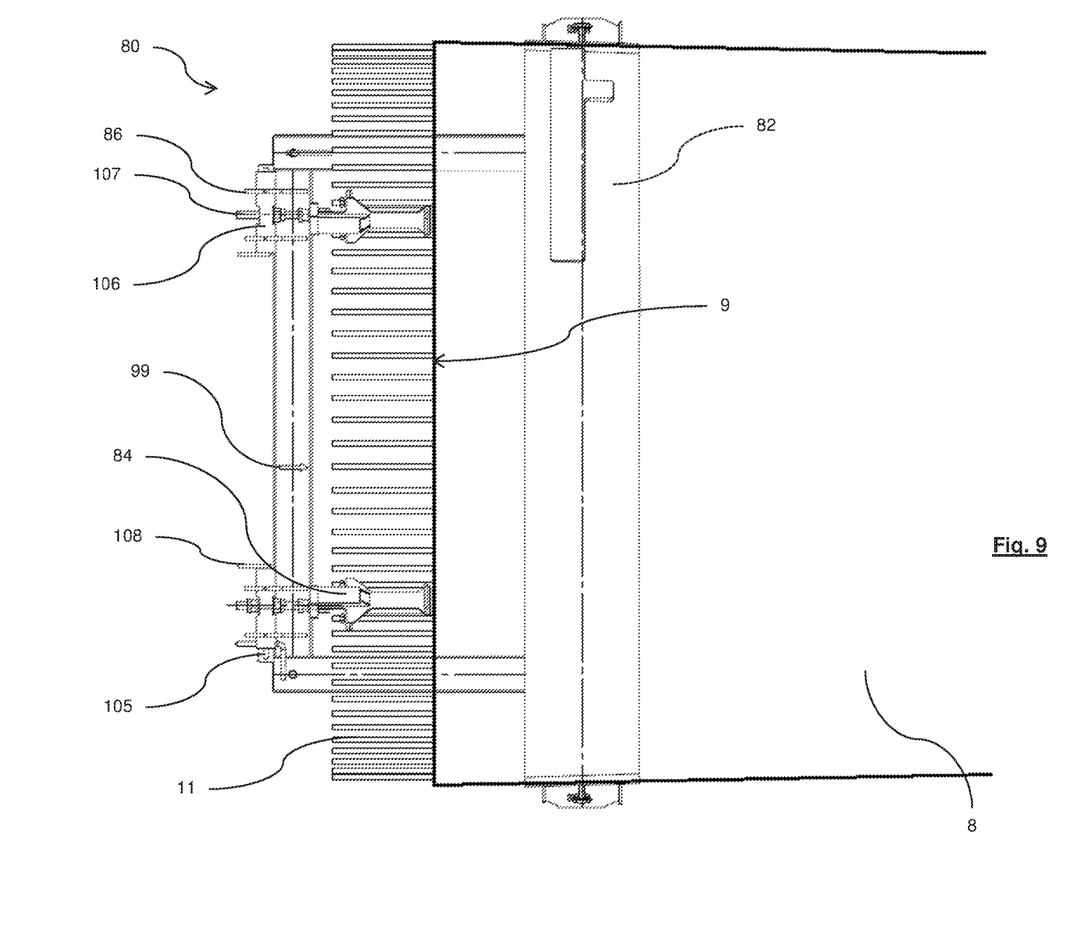
FIG. 9 shows a figurative plan view of a blade root held in a root transport frame.
Figure 10:
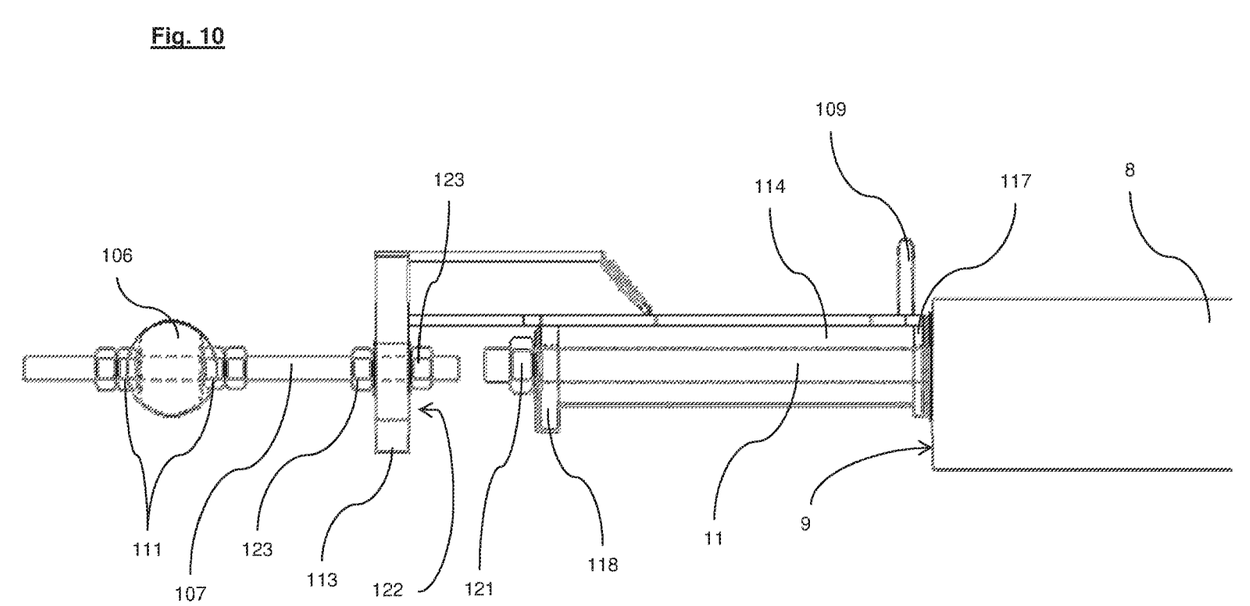
FIG. 10 shows a side view of some details of a root frame interface clamp.
Figure 10A:
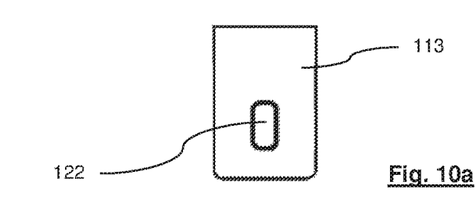
FIG. 10a shows a hidden detail of a load plate from FIG. 10.

With the blade root 8 in place, as illustrated for example in FIG. 9, the exact distance between the root face 9 and the hinge 106 may be measured. If needed, a precise length adjustment of the interface clamp 84 may be made by adjusting its effective length, that is to say, its length between a forward nose 102, including a root face abutment surface 115, and its hinge point 101.

The adjustment may be carried out by an operator, by first loosening the hinge point 101 connection between the hinge 106 and the interface clamp 84. The connection at the load plate 113 between the shank 107 and the clamp body 114 is also loosened. This may be done using manual hand-held tools preferably without the need for power tools. The lock 104 is removed from the locking plate 105 and the interface clamp 84 is gently lowered forwards about its hinge axis 110, in a distal direction of the blade 1 until it lies proximate one or more stud bolts 11.

The correct length in this context is that length which, with the interface clamp 84 securely and tightly fixed at its hinge point 101 to the root frame 10, puts the abutment surface 115 into abutment with the root face 9. Therefore, with the hinge point length adjustments 111 loosened, and with the height regulators 123 at the clamp body 114 loosened, in particular on each side of the load plate 113, the clamp body 114 is placed over one or more relevant stud-bolts 11 so that it sits snugly on these with the abutment face 115 pushed up against the root face 9. Thereafter, the height adjustment 123 is set such that the shank 107 passes at the correct height through the load plate 113, and tightened. After this, the length adjustment 111 is set to the desired distance along a shank 107 before tightening the shank 107 in relation to the hinge 106. In the illustrated example, the length adjustment is carried out at the hinge 106. The length adjusting elements 111 include setting and tightening nuts on the threaded shank 107 and on both sides of the hinge 106. Preferably, all tightening, adjusting or loosening operations may be carried out by an operator using hand tools preferably without needing powered equipment. If necessary, a second or subsequent interface clamp 84 is positioned in the same way.

When in place, the interface clamps 84 ensure secure retention of the blade 1 in the root frame 10, even in the event of vibrations or longitudinal loads on the blade 1 caused by movements or oscillations. In one aspect, in order to lower the loads on the blade 1 during transport, the tip saddle preventer 56 at a tip frame 20 may be released allowing some longitudinal translation movement of the tip saddle 52 in the tip frame 20. This may both prevent unnecessary stress on the blade 1 and reduce the need for lashings at a tip frame 20 or tip stack. Instead, loads are securely transferred from the blade 1 to the root frame 10 or root frame stack. In embodiments, it may be desirable to increase the effective length of the root frames 10 to thereby further increase their ability to withstand longitudinal loads and to reduce the need for lashing at the root frames 10 during transport.

The examples illustrated herein show a variety of optional features not all of which need to be combined together in the context of the invention. On the other hand, all and any recited features may be combined together unless prevented by the laws of physics or unless manifestly impossible for another reason.

The invention claimed is:

1. A transport frame having a longitudinal, lateral and upright extent, and configured for transporting a root end of a longitudinally extending wind turbine blade having a root face with protruding stud-bolts, said frame comprising a root saddle, said frame further comprising a releasable interface clamp configured for fixing a said blade root in said frame, said interface clamp extending from a forward nose through a rear hinge point in said root frame and, said interface clamp comprising a body with a forward abutment surface and a bearing surface longitudinally rearward of said abutment surface with respect to the transport frame, said body being hingedly movable into or out of engagement with one or more of the stud bolts protruding from the root face of a blade when positioned in said saddle, said interface clamp having a retracted position with its body away from said blade root face and away from said protruding stud-bolts, said interface clamp having an engagement position in which its said bearing surface extends transverse and adjacent to one or more said stud-bolts such that a tightening force applied to a said bearing surface pushes said abutment surface against said root face.

2. The transport frame according to claim 1, wherein said interface clamp is configured such that said abutment surface is provided on an abutment plate at a said nose of said interface clamp body, while a said bearing surface is provided on a bearing plate at a rearward portion of said body, spaced apart from said abutment plate.

3. The transport frame according to claim 2, wherein said abutment plate is configured for engagement with a first stud-bolt and wherein said bearing plate is configured for engagement with a second stud-bolt and/or third stud-bolt, each or either being directly adjacent said first stud-bolt.

4. The transport frame according to claim 1, wherein said interface clamp comprises a grab handle facilitating movement of said interface clamp, by an operator, between said engagement position and said retracted position.

5. The transport frame according to claim 1, wherein said hinge point of said interface clamp is anchored in said frame.

6. The transport frame according to claim 4, wherein said root saddle is pivotable on a saddle support of said frame and wherein said hinge point of said interface clamp is fixed to said saddle support and movable relative to said frame with said pivot motion of said saddle.

7. The transport frame according to claim 1, wherein said interface clamp is length adjustable between said nose and said hinge point.

8. The transport frame according to claim 1, wherein said interface clamp is lockable in the retracted position against movement about its hinge point.

9. The transport frame according to claim 1, said interface clamp including a blocker capable of blocking movement of said interface clamp under gravity and in a direction away from said saddle or blade root.

10. The transport frame according to claim 1, comprising two or more said interface clamps.

11. The transport frame according to claim 1, wherein a said abutment surface and/or a said bearing surface is provided on a respective abutment plate and/or bearing plate of said interface clamp body, and wherein said abutment and/or bearing plate is configured to extend transversely on both sides of one said stud-bolt protruding from a blade root face.

12. The transport frame according to claim 11, wherein said abutment plate and/or bearing plate of said interface clamp body is provided slotted for receiving a said stud-bolt in said slot.

13. The transport frame according to claim 1, wherein substantially all longitudinal forces between said frame and a said blade supported therein are transmitted via said one or more interface clamp, when said interface clamp or clamps is/are in said engagement position with said blade root face and said stud bolts.

14. A transport frame pair configured for transporting a wind turbine blade, said frame pair comprising a tip frame and a root frame, each said tip and root frame being stackable with identical frames for blade transport or storage, each one of said tip and root frame comprising four upright frame struts which together define a generally cuboid internal space having a longitudinal extent between two pairs of said upright struts;

said tip frame comprising a tip saddle assembly within said generally cuboid internal space, and said root frame comprising a root saddle assembly within said generally cuboid internal space, and wherein said root frame is configured to prohibit a translation movement of said root saddle assembly in a longitudinal direction of a blade supported in a root saddle of said root saddle assembly;

said root frame being a transport frame according to claim 1; and wherein said tip frame allows a translation movement of said tip saddle assembly in a longitudinal direction of a blade supported in a tip saddle of said tip saddle assembly.

15. The transport frame pair according to claim 14, wherein said longitudinal extent of said root frame is more than twenty percent greater than the longitudinal extent of said tip frame.

16. A method for securing the wind turbine blade root in the root transport frame according to claim 1, said wind turbine blade having a root face with the stud-bolts protruding therefrom, said method including placing said wind turbine blade root in said root saddle of said transport frame, securing said blade root by positioning said hinged interface clamp on one or more said stud-bolt of said wind turbine blade such that a said bearing surface of said interface clamp body lies immediately adjacent and transverse to said stud-bolt, and applying a pushing force on said bearing surface by means of a tightening member on said stud-bolt thereby urging a said abutment surface of said interface clamp body into engagement with said root face, thereby immobilising said blade against longitudinal movement in relation to said hinge point or in relation to said frame.

17. The method according to claim 16, further including the step of adjusting the length of the interface clamp between its hinge point and its nose, prior to applying said tightening force on said bearing surface.

18. The method according claim 16, further comprising:
providing a tip frame having a tip saddle assembly;
securing said wind turbine blade in the tip frame, and
transporting said wind turbine blade with said tip saddle assembly freely movable in translation in a said longitudinal direction and relative to said tip frame.

* * * * *